United States Patent [19]

Nishizaki et al.

[11] Patent Number: 5,037,564
[45] Date of Patent: Aug. 6, 1991

[54] DISPERSING AGENT FOR NONAQUEOUS SYSTEMS AND A NONAQUEOUS DISPERSION CONTAINING THE SAME

[75] Inventors: Shoichi Nishizaki, Shiga; Tominobu Mayuzumi; Takeshi Kawano, both of Kyoto, all of Japan

[73] Assignee: Dai-Ichi Kogyo Seiyaku Co., Ltd., Kyoto, Japan

[21] Appl. No.: 320,150

[22] Filed: Mar. 7, 1989

[30] Foreign Application Priority Data

| Mar. 9, 1988 [JP] | Japan | 63-55630 |
| Mar. 9, 1988 [JP] | Japan | 63-55631 |
| May 11, 1988 [JP] | Japan | 63-113820 |

[51] Int. Cl.$^5$ .............. C10M 105/22; C10M 125/00
[52] U.S. Cl. ................................. 252/22; 252/21; 252/17; 252/56 S; 252/56 R
[58] Field of Search ................... 252/17, 21, 22

[56] References Cited

U.S. PATENT DOCUMENTS

| 2,560,051 | 7/1951 | Brown | 252/22 |
| 3,156,728 | 11/1964 | Orloff et al. | 252/17 |
| 4,465,802 | 8/1984 | Dennen et al. | 252/857 |
| 4,711,734 | 12/1987 | Fujita et al. | 252/28 |
| 4,787,995 | 11/1988 | Nichols et al. | 252/49.5 |

OTHER PUBLICATIONS

The Journal of the Society of Cosmetic Chemists, vol. 13, No. 4, 173–187, published in the United Kingdom by Society of Cosmetic Chemists of Great Britain, in May 1962.

Primary Examiner—Prince E. Willis
Assistant Examiner—E. McAvoy
Attorney, Agent, or Firm—Jordan and Hamburg

[57] ABSTRACT

A dispersing agent for use in dispersing a finely divided solid powder in a nonaqueous dispersion medium and a dispersion prepared by using the dispersing agent. The dispersing agent of this invention is a low acid value lanolin fatty acid and/or a salt of the same. By means of this dispersing agent, there can be easily obtained a homogeneous and stable nonaqueous dispersion from which the incorporated solid particles will not separate out or settle even on prolonged standing. Therefore, this dispersing agent can be used advantageously in a broad range of applications such as coatings, dyes, pigments, inks, fuels, lubricating materials and so on.

6 Claims, No Drawings

DISPERSING AGENT FOR NONAQUEOUS SYSTEMS AND A NONAQUEOUS DISPERSION CONTAINING THE SAME

BACKGROUND OF THE INVENTION

This invention relates to a dispersing agent for nonaqueous systems and a nonaqueous dispersion containing the dispersing agent. More particularly, this invention relates to a dispersing agent which is conducive to the production of dispersions of finely divided solid powders in nonaqueous media with improved dispersibility and dispersion stability and nonaqueous dispersions prepared with the aid of the dispersing agent.

As dispersing agents for use in dispersing finely divided solids in nonaqueous solvents, polyesters of 12-hydroxystearic acid and polyesters of castor oil fatty acid (acid values ranging from 10 to 100 mg-KOH/g), for instance, have been proposed in Japanese Patent Publication No. 54-34009. Lanolin-based surfactants have also been described in Vinyl and Polymers 20, (1), 12-20 (1980) (Institute of Polymer Industry). Moreover, Japanese Patent Publication No. 56-45515 suggests the use of lanolin fatty acid soap as a dispersing agent for pigments.

However, these known dispersing agents cannot provide a nonaqueous dispersion with sufficient dispersibility and dispersion stability and if only for the reason that, on prolonged storage, solid particles separate out from the dispersion, have not proved satisfactory in field performance.

Meanwhile, efforts have been being made to provide lubricating oils such as mineral, synthetic, animal, vegetable and other oil with sufficient resistance to super-high pressure and friction by incorporating various solid or liquid additives and its is known to be particularly beneficial to add a solid lubricating agent such as carbon fluoride powder or fluororesin powder to the base lubricating oil.

However, carbon fluoride and fluororesin are so low in the affinity for oils in general that such lubricating oil systems are extremely unstable, undergoing flocculation and settling within one day after addition of the powder. Therefore, as dispersing agents for use in dispersing solid lubricants, Japanese Patent KOKAI Publication No. 60-56760 recommends nonionic surfactants such as polyoxypropylene alkyl ethers, polyoxypropylene alkyl phenyl ethers and so on.

However, dispersions obtained with these known dispersing agents for solid lubricants are not sufficiently stable and fail to exhibit the desired lubricating function under field conditions. Moreover, these dispersing agents form sediments on prolonged standing. Therefore, such dispersions cannot be satisfactory lubricating oil systems.

SUMMARY OF THE INVENTION

It is an object of this invention to provide a dispersing agent which is capable of imparting improved dispersibility and long-term dispersion stability to dispersions of finely divided solid powders in non-aqueous media and nonaqueous dispersions containing said dispersing agent.

It is another object of this invention to provide a lubricating oil composition containing a solid lubricating agent and said dispersing agent, which has excellent long-term dispersion stability.

This invention is concerned with a dispersing agent for nonaqueous systems which comprises a low acid value lanolin fatty acid and/or a salt thereof and a dispersion comprising said dispersing agent, a finely divided solid and a nonaqueous dispersion medium.

DETAILED DESCRIPTION OF THE PREFERRED EMBODIMENT

The above-mentioned low acid value lanolin fatty acid of this invention can be produced by subjecting lanolin fatty acid to high-temperature dehydration reaction.

The lanolin fatty acid mentioned above is prepared by saponification of wool grease or lanolin and occurs as a mixture having the composition indicated in Table 1.

TABLE 1

Composition of lanolin fatty acid
(E. V. Truter, J. Soc. Cosm. Chem. 1962)

| Constituent fatty acid | Number of carbon atoms | % Content |
|---|---|---|
| n-Fatty acids | Even number $C_{10}$–$C_{32}$ acids | 7 |
| n-Fatty acids | Odd number $C_{13}$–$C_{17}$ acids | |
| iso-Fatty acids | Even number $C_{10}$–$C_{32}$ acids | 23 |
| anteiso-Fatty acids | Odd number $C_9$–$C_{31}$ acids | 30 |
| α-Hydroxy-n-fatty acids | Even number $C_{12}$–$C_{14}$ acids | 15 |
| α-Hydroxy-n-fatty acids | Odd number $C_{13}$–$C_{23}$ acids | |
| α-Hydroxy-iso-fatty acids | Even number $C_{14}$–$C_{24}$ acids | 11 |
| αHydroxy-anteiso-fatty acids | Odd number $C_{13}$–$C_{25}$ acids | 4 |
| ω-Hydroxy-n-fatty acids | Even number $C_{26}$–$C_{34}$ acids | 3 |
| ω-Hydroxy-iso-fatty acids | Even number $C_{30}$–$C_{32}$ acids | 0.5 |
| ω-Hydroxy-anteiso-fatty acids | Odd number $C_{27}$–$C_{33}$ acids | 1 |
| Others | | 5.5 |

The acid value (unit: mg-KOH/g) and saponification value (unit: mg-KOH/g) of the above-mentioned lanolin fatty acid are generally in the range of 130 to 160 and the range of 160 to 180, respectively. As is apparent from the above composition table, the predominant constituents of lanolin fatty acid are higher fatty acids in a broad carbon number range of 9 to 32 and α-hydroxy fatty acids in a carbon number range of 12 to 25. Therefore, the low acid value lanolin fatty acid of this invention can be prepared by esterifying lanolin fatty acid with elimination of water at elevated temperature so as to reduce its acid value.

Thus, the desired low acid value lanolin fatty acid can be produced by heating lanolin fatty acid under reduced pressure, either in the absence of a catalyst or in the presence of an appropriate esterification catalyst, preferably at a temperature between 160° and 220° C. until a certain low acid value is obtained. Heating the above-mentioned lanolin fatty acid containing hydroxy fatty acids under reduced pressure yields lactides through elimination of two mols of water from 2 mols of hydroxy fatty acid and cyclic esters such as lactones through intramolecular dehydration, as well as straight-chain monoesters and straight-chain polyesters.

The acid value of the low acid value lanolin fatty acid of this invention is preferably in the range of 90 to 125 and, for still better results, in the range of 100 to 115. If the acid value is outside the first-mentioned range, dispersing ability is more or less unsatisfactory. Thus, control of acid value is of great importance.

Thus, only on reduction of its acid value by esterification can the starting material lanolin fatty acid acquire sufficient utility as a dispersing agent for solid powders and the resulting low acid value lanolin fatty acid exhibits a remarkably high dispersing power surpassing that of the conventional high acid value lanolin fatty acid or its salts.

It appears that as the conventional high acid value lanolin fatty acid is subjected to dehydration at elevated temperature, the hydroxyl groups of hydroxy fatty acids it contains decrease in number and because of the esterification with the available fatty acids having alkyl groups of broadly scattered numbers of carbon atoms, its affinity for nonaqueous media and solid particles is improved, thus bringing about satisfactory effects.

The water byproduced in the course of esterification reaction is preferably removed from the reaction system as it is formed. The removal of water can be easily accomplished by heating under reduced pressure. The reaction may be carried out in a stream of nitrogen gas or with azeotropic distillation using a solvent. The product low acid value lanolin fatty acid can be separated from the reaction mixture by the per se conventional procedure. However, unless the organic solvent used in the reaction is of the type detrimental to dispersibility, the reaction mixture as such can be utilized.

Salts of this low acid value lanolin fatty acid are also effective dispersing agents.

The salts mentioned above include, among others, salts with alkali metals such as sodium, potassium, lithium, etc.; salts with alkaline earth metals such as calcium, barium, magnesium, etc.; and salts with lead, zinc, etc. Furthermore, salts with ammonia and amines are likewise useful. As examples of said amines, there may be mentioned alkylamines, polyamines such as ethylenediamine, diethylenetriamine, triethylenetetramine, etc.; morpholine, piperidine, alkanolamines and so on.

Such a salt of low acid value lanolin fatty acid can be produced by subjecting a low acid value lanolin fatty acid and the corresponding base in more or less stoichiometrically equivalent amounts to neutralization reaction at an elevated temperature up to 200° C. with stirring. For the purposes of this reaction, the base may be added either as it is or as dispersed or dissolved in an organic solvent, for example a petroleum oil fraction.

Instead of using the isolated salt of low acid value lanolin fatty acid, the reaction mixture containing the above-mentioned organic solvent can be used as it is. If necessary, the unreacted metal oxide or hydroxide can be removed by the conventional procedure.

The finely divided solid powders (dispersoids) which can be successfully dispersed with the dispersing agent of this invention include, among others, inorganic or organic dyes and pigments such as titanium dioxide, iron oxide, zinc oxide, clay, satin white, white carbon, prussian blue, aquamarine, carbon black, phthalocyanine pigments, quinacridone, perinone and perylene pigments, insoluble azo pigments, lakes, etc.; inorganic or organic fillers such as charcoal, lime, coke, petroleum coke, mica, calcium carbonate, magnesium hydroxide, alumina, silicates, etc.; toners; solid lubricants; and so on.

The nonaqueous dispersion media for dispersing said finely divided solid powders therein include, among others, mineral, animal and vegetable oils, various waxes, fatty acid esters, alcohols, paraffins, aromatic carboxylic acid esters, chlorinated hydrocarbons, polyolefin oils, silicone oils, ketones and so on. These dispersion media can be used singly or in admixture.

While the dispersing agent of this invention is effective for all solid powders irrespective of particle diameter, it is generally used for finely divided solid powders with particle diameters up to 200 $\mu$m and preferably for those having particle diameters not exceeding 100 $\mu$m. The amount of this dispersing agent is preferably 0.01 to 20 weight percent based on the total dispersion and, for still better results, 0.02 to 10 weight percent on the same basis.

While the amount of finely divided solid powder in the nonaqueous dispersion system is not critical only provide a dispersion is formed, it is generally in the range of 0.5 to 80 weight percent.

In using the dispersing agent of this invention, any of the known dispersing machines such as homogenizer, kneader, sand mill, 3-roll mill, ball mill, bead mill, line mixer, etc., can be successfully employed. The dispersing agent of this invention can be added either before or after pulverization or dispersion with such a machine.

Furthermore, the dispersing agent of this invention may be used singly or in combination with other known anionic or nonionic oil-soluble surfactants. The amount of such surfactants is preferably less than the amount of the dispersing agent of this invention. As examples of such surfactants, there may be mentioned oleic acid soap, polycarboxylates, petroleum sulfonates, phosphoric acid esters of higher alcohols, dialkylsulfosuccinates, polyoxyethylene alkyl ethers, polyoxyethylene alkyl phenyl ethers, sorbitan fatty acid esters, polyoxyethylene-sorbitan fatty acid esters and so on.

The dispersing agent of this invention causes solid dispersoid particles to be deflocculated and uniformly dispersed in finely divided state to give a fluid or semifluid dispersion. This effect is not adversely affected even on addition of other ingredients such as a thickener, rheology modifier, resin, oxidation inhibitor, wetting agent, antifoam, etc.

Thus, by means of the dispersing agent of this invention, there can be easily obtained a homogeneous and stable nonaqueous dispersion from which solid particles will not readily separate out even on prolonged storage. Therefore, the dispersing agent of this invention can be used as an effective disperser in a broad range of applications such as coatings, dyes, pigments, inks, fuels, lubricating materials and so on.

Particularly, a lubricating oil composition prepared by dispersing a solid lubricant in a lubricating oil with the aid of the dispersing agent of this invention retains dispersion stability over a long period of time.

Examples of the solid lubricant which can be dispersed with the dispersing agent of this invention include fluorides such as carbon fluoride, aluminum fluoride, calcium fluoride, etc.; natural graphite; carbon black; organic molybdenum compounds such as molybdenum dithiocarbamate, molybdenum dithiophosphate, etc.; nitrides such as silicon nitride, boron nitride, etc.; molybdenum disulfide; metal oxides such as zinc oxide, aluminum oxide, boron oxide, etc.; powdery fluororesins such as polytetrafluoroethylene etc.; melamine cyanurate resin powder; lead sulfide, molybdenum disulfide, calcium fluoride, etc. as coated with boron oxide; and so on.

The particle size or diameter of such solid lubricants is generally not more than 20 $\mu$m, and those having a narrow particle size distribution with a mean diameter of 0.02 to 10 μm are preferred.

When a salt of low acid value lanolin fatty acid is used as the dispersing agent, it is preferably an alkaline earth metal salt of low acid value lanolin fatty acid in consideration of friction resistance and friction relieving function.

As to the lubricating oil (dispersion medium) to which a dispersoid solid lubricant is added, any of the fluid lubricating oils in commercial use can be employed. Preferred examples of such lubricating oils are mineral oils such as naphthenic hydrocarbon oils, paraffinic hydrocarbon oils, etc.; synthetic oils such as synthetic hydrocarbon oils, polyolefin oils, alkylated aromatic oils, polyether oils, ester oils, halogenated hydrocarbon oils, silicone oil, fluorine oil, etc.; and oils of animal or vegetable origin; on condition that the oils mentioned above have viscosities in the range of 5 to 3000 cps and are liquid at room temperature.

The amount of the solid lubricant in the lubricating oil composition is optional provided a dispersion can be formed but is generally in the range of 0.05 to 40 weight percent. If the proportion of the solid lubricant is less than 0.05 weight percent, no sufficient lubricating function can be obtained, while the use of the solid lubricant in excess of 40 weight percent is uneconomical. The dispersing agent is added preferably at the level of 0.01 to 20 weight percent and, for still better results, at the level of 0.02 to 10 weight percent based on the total lubricating oil composition.

The lubricating oil composition can be produced, for example by the steps of dissolving the dispersing agent of this invention in a base lubricating oil, then adding a predetermined amount of solid lubricant, and mixing them thoroughly by means of a dispersing machine capable of generating a sufficient shear force to disrupt secondary particles of the solid lubricant, such as a 3-roll mill, colloid mill, homogenizer, ball mill, kneader, line mixer or the like.

The resulting lubricating oil composition is excellent in long-term dispersion stability, remaining stable even after, say, more than 6 months of standing.

Furthermore, this solid lubricant-containing lubricating oil composition has satisfactory resistance to superhigh pressure with a low coefficient of friction so that, when blended with general machine lubricating oils such as refrigerating machine oil, engine oils, spindle oil, dynamo oil, machine oil, turbine oil, gear oil, cylinder oil and other hydraulic oils, it prevents seizure even under rigorous operating conditions and contributes a great deal to reduced wear of sliding surfaces. In addition, this composition is also useful as a metal machining oil or a lubricating oil for textile fiber treatment.

In order to enhance the long-term dispersion stability of a solid-lubricant-containing lubricating oil composition at high temperature, it is preferable to use a low acid value lanolin fatty acid and/or a salt thereof (component A) in combination with a hydrogenated castor oil fatty acid and/or a saturated fatty acid containing 8 to 24 carbon atoms (component B).

The hydrogenated castor oil fatty acid is a fatty acid which is composed predominantly of 12-hydroxystearic acid and contains minor proportions of stearic acid, palmitic acid, ricinoleic acid and so on.

The saturated fatty acid containing 8 to 24 carbon atoms include, among others, lauric acid, tridecylic acid, myristic acid, palmitic acid, stearic acid, lignoceric acid and so on. Coconut oil fatty acid and beef tallow fatty acid, which are composed predominantly of these fatty acids, can also be employed.

The blending ratio of component A to component B (A/B ratio) is 98:2 through 50:50 and preferably 98:2 through 70:30.

When a surfactant is additionally used, its amount is preferably less than the total amount of components A and B.

Thus, a solid lubricant-containing lubricating oil composition prepared using, as a dispersing agent, said low acid value lanolin fatty acid and/or salt together with said hydrogenated castor oil fatty acid and/or saturated fatty acid containing 8 to 24 carbon atoms retains sufficient dispersion stability even at a high temperature of 50° to 90° C. for a long period of time.

The following examples and comparative examples are intended to illustrate this invention in further detail and should by no means be construed as being limitative.

EXAMPLES 1 TO 20 AND COMPARATIVE EXAMPLES 1 TO 6

A 2-liter stainless steel ball mill was charged with various dispersion media, finely divided solids and dispersing agents in the proportions and combinations indicated in Table 2. In each case, the total charge was 300 g. Each charge was milled for 2 hours to prepare a dispersion. This dispersion was transferred to a 100 ml measuring cylinder, which was maintained in an incubator at 25° C. After 30, 60 and 90 days, respectively, the sediment layer in the measuring cylinder was observed to evaluate the stability of the dispersion. The results are shown in Table 2. The symbols in the table have the following meanings.

o: No sediment
Δ: Slight sediment
x: Significant sediment

TABLE 2

| Finely divided solid | | Dispersion medium | | Dispersing agent | | Dispersibility (shelf-life) | | |
|---|---|---|---|---|---|---|---|---|
| Type | Parts by weight | Type | Parts by weight | Type ( ) = acid value | Parts by weight | After 30 days | After 60 days | After 90 days |
| Examples | | | | | | | | |
| 1 Carbon black | 5 | Mineral terpene | 93 | Low acid value LFA (123) | 2 | | | Δ |
| 2 Carbon black | 5 | Mineral terpene | 93 | Low acid value LFA (112) | 2 | | | |
| 3 Carbon black | 5 | Mineral terpene | 93 | Low acid value LFA (101) | 2 | | | |
| 4 Carbon black | 5 | Xylene | 93 | Low acid value LFA (112) Na | 2 | | | |
| 5 Carbon black | 15 | Dioctyl phthalate | 83 | Low acid value LFA (101) Ca | 2 | | | |
| 6 Titanium dioxide | 40 | Dioctyl phthalate | 59 | Low acid value LFA (101) Ca | 1 | | | |
| 7 Titanium dioxide | 50 | Mineral terpene | 48 | Low acid value LFA (112) | 2 | | | |
| 8 Titanium dioxide | 50 | Mineral terpene | 48 | Low acid value LFA (101) | 2 | | | |
| 9 Titanium dioxide | 50 | Kerosine | 48 | Low acid value LFA (101) MEA | 2 | | | |

TABLE 2-continued

| Finely divided solid | | Dispersion medium | | Dispersing agent | | Dispersibility (shelf-life) | | |
|---|---|---|---|---|---|---|---|---|
| Type | Parts by weight | Type | Parts by weight | Type ( ) = acid value | Parts by weight | After 30 days | After 60 days | After 90 days |
| 10 Petroleum coke | 50 | Kerosine | 49.5 | Low acid value LFA (112) | 0.5 | | | |
| 11 Petroleum coke | 50 | Mineral terpene | 49.5 | Low acid value LFA (101) Ca | 0.5 | | | |
| 12 Aluminum silicate | 30 | Mineral terpene | 69 | Low acid value LFA (112) MEA | 1 | | | |
| 13 Aluminum silicate | 30 | Xylene | 69 | Low acid value LFA (101) | 1 | | | |
| 14 Aluminum silicate | 30 | Xylene | 69 | Low acid value LFA (101) Ca | 1 | | | |
| 15 Phthalocyanine blue | 20 | Xylene | 77 | Low acid value LFA (101) Ca | 3 | | | |
| 16 Phthalocyanine blue | 20 | Xylene | 77 | Low acid value LFA (112) | 3 | | | |
| 17 Phthalocyanine blue | 20 | Mineral terpene | 78 | Low acid value LFA (101) | 2 | | | |
| 18 Insoluble azo pigment | 20 | Mineral terpene | 78 | Low acid value LFA (112) Ca | 2 | | | |
| 19 Insoluble azo pigment | 20 | Xylene | 78 | Low acid value LFA (101) Na | 2 | | | |
| 20 Insoluble azo pigment | 20 | Xylene | 78 | Low acid value LFA (101) | 2 | | | |
| Comparative Examples | | | | | | | | |
| 1 Carbon black | 5 | Mineral terpene | 95 | Not added | — | x | — | — |
| 2 Carbon black | 5 | Mineral terpene | 92 | Zinc stearate | 3 | x | — | — |
| 3 Carbon black | 5 | Mineral terpene | 92 | LFA (151).Ca | 3 | x | — | — |
| 4 Titanium dioxide | 50 | Mineral terpene | 47 | Low acid value HSA (35) | 3 | x | — | — |
| 5 Titanium dioxide | 50 | Mineral terpene | 47 | Sorbitan monooleate | 3 | x | — | — |
| 6 Phthalocyanine blue | 20 | Mineral terpene | 77 | $C_{12}H_{24}O(C_2H_4O)_5H$ | 3 | x | — | — |

Notes
LFA: lanolin fatty acid.
MEA: monoethanolamine.
HSA: 12-hydroxystearic acid.
$C_{12}H_{24}O(C_2H_4O)_5H$: lauryl alcohol-ethylene oxide (5 mol) adduct It is apparent from Table 2 that dispersions with high long-term stability could be obtained with the dispersing agents of this invention.

On the other hand, the dispersions of Comparative Examples invariably showed large amounts of sediments.

EXAMPLES 21 TO 33 AND COMPARATIVE EXAMPLES 7 TO 11

In 196 g portions of spindle oil, an example of lubricating oil, were respectively dissolved 2 g each of the dispersing agents shown in Table 3, followed by addition of 2 g each of the solid lubricants shown in Table 3. Each mixture was thoroughly milled in a ball mill to give a lubricating oil composition. This lubricating oil composition was transferred to a 100 ml measuring cylinder and the stability of the dispersion was evaluated under the above-mentioned conditions. The results are shown in Table 3.

It is apparent from Table 3 that, with the dispersing agents of this invention, lubricating oil compositions with long-term stability can be obtained.

On the other hand, the lubricating oil compositions of Comparative Examples invariably showed large amounts of sediments.

EXAMPLES 34 TO 48 AND COMPARATIVE EXAMPLES 12 TO 18

In 190 g portions of spindle oil, an example of lubricating oil, were respectively dissolved 5 g each of the dispersing agents (mixtures of components A and B) indicated in Table 4, followed by addition of 5 g each of the solid lubricants shown in Table 4. Each mixture was thoroughly milled in a ball mill to give a lubricating oil composition. This lubricating oil composition was transferred to a 100 ml measuring cylinder and kept in an incubator at 60° C. The dispersion stability was eval-

TABLE 3

| | | Dispersibility (shelf-life) | | |
|---|---|---|---|---|
| Dispersing agent ( ) = acid value | Solid lubricant ( ) = mean particle | After 30 days | After 60 days | After 90 days |
| Examples | | | | |
| 21 Low acid value LFA (124) | Carbon fluoride (2 μm) | ∘ | ∘ | Δ |
| 22 Low acid value LFA (112) | Carbon fluoride (2 μm) | | | |
| 23 Low acid value LFA (101) | Carbon fluoride (2 μm) | | | |
| 24 Low acid value LFA (112) Ca | Carbon fluoride (2 μm) | ∘ | ∘ | ∘ |
| 25 Low acid value LFA (112) Ca | Natural graphite (0.8 μm) | | | |
| 26 Low acid value LFA (101) | Natural graphite (0.8 μm) | ∘ | ∘ | ∘ |
| 27 Low acid value LFA (112) Mg | Natural graphite (0.8 μm) | ∘ | | ∘ |
| 28 Low acid value LFA (112) Mg | Fluororesin powder (1.5 μm) | ∘ | ∘ | ∘ |
| 29 Low acid value LFA (101) Ca | Fluororesin powder (1.5 μm) | | | |
| 30 Low acid value LFA (112) | Fluororesin powder (1.5 μm) | | | |
| 31 Low acid value LFA (112) | Molybdenum dithiocarbamate (2 μm) | ∘ | ∘ | ∘ |
| 32 Low acid value LFA (101) Ca | Molybdenum dithiocarbamate (2 μm) | | | |
| 33 Low acid value LFA (112) Na | Molybdenum dithiocarbamate (2 μm) | | | |
| Comparative Examples | | | | |
| 7 Not added | Carbon fluoride (2 μm) | x | — | — |
| 8 Zinc stearate | Carbon fluoride (2 μm) | x | — | — |
| 9 LFA (151) Ca | Carbon fluoride (2 μm) | x | — | — |
| 10 OPPO | Carbon fluoride (2 μm) | Δ | x | — |
| 11 Low acid value HSA (35) | Carbon fluoride (2 μm) | x | — | — |

Notes
LFA: lanolin fatty acid
OPPO: octylphenol-propylene oxide (20 mol) adduct
HSA: 12-hydroxystearic acid uated in the same manner as described hereinbefore. The results are shown in Table 4.

TABLE 4

| Dispersing agent | | | Solid lubricant | Dispersibility (shelf-life) | | |
|---|---|---|---|---|---|---|
| Component A ( ) = acid value | Component (B) | Blending ratio (A:B) | ( ) = mean particle size | After 30 days | After 60 days | After 90 days |
| Examples | | | | | | |
| 34 Low acid value LFA (120) | H-castor oil FA | 90:10 | Silicon nitride (2 μm) | ○ | ○ | ○ |
| 35 Low acid value LFA (105) | H-castor oil FA | 75:25 | Silicon nitride (2 μm) | ○ | ○ | ○ |
| 36 Low acid value LFA (120) Ca | H-castor oil FA | 75:25 | Silicon nitride (2 μm) | ○ | ○ | ○ |
| 37 Low acid value LFA (105) Mg | H-castor oil FA | 75:25 | Silicon nitride (2 μm) | ○ | ○ | ○ |
| 38 Low acid value LFA (105) Na | H-castor oil FA | 75:25 | Silicon nitride (2 μm) | ○ | ○ | ○ |
| 39 Low acid value LFA (105) | Stearic acid | 75:25 | Silicon nitride (2 μm) | ○ | ○ | ○ |
| 40 Low acid value LFA (120) Ca | Stearic acid | 75:25 | Silicon nitride (2 μm) | ○ | ○ | ○ |
| 41 Low acid value LFA (105) Mg | Stearic acid | 75:25 | Silicon nitride (2 μm) | ○ | ○ | ○ |
| 42 Low acid value LFA (120) | H-castor oil FA | 75:25 | Carbon fluoride (4 μm) | ○ | ○ | ○ |
| 43 Low acid value LFA (105) | H-castor oil FA | 75:25 | Carbon fluoride (4 μm) | ○ | ○ | ○ |
| 44 Low acid value LFA (120) Ca | H-castor oil FA | 75:25 | Carbon fluoride (4 μm) | ○ | ○ | ○ |
| 45 Low acid value LFA (105) Mg | H-castor oil FA | 75:25 | Carbon fluoride (4 μm) | ○ | ○ | ○ |
| 46 Low acid value LFA (105) Na | H-castor oil FA | 75:25 | Carbon fluoride (4 μm) | ○ | ○ | ○ |
| 47 Low acid value LFA (120) Ca | Stearic acid | 75:25 | Natural graphite (0.5 μm) | ○ | ○ | ○ |
| 48 Low acid value LFA (105) Mg | Stearic acid | 75:25 | Natural graphite (0.5 μm) | ○ | ○ | ○ |
| Comparative Examples | | | | | | |
| 12 Not added | — | — | Silicon nitride (2 μm) | x | — | — |
| 13 Stearic acid | — | — | Silicon nitride (2 μm) | x | — | — |
| 14 LFA (151) Ca | — | — | Silicon nitride (2 μm) | x | — | — |
| 15 OPPO | — | — | Silicon nitride (2 μm) | x | — | — |
| 16 Low acid value HSA (35) | — | — | Silicon nitride (2 μm) | x | — | — |
| 17 LFA (124) | — | — | Silicon nitride (2 μm) | ○ | Δ | x |
| 18 OPPO | H-castor oil FA | 75:25 | Silicon nitride (2 μm) | x | — | — |

Notes
LFA: lanolin fatty acid
OPPO: octylphenol-propylene oxide (20 mol) adduct
HSA: 12-hydroxystearic acid
H-castor oil FA: hydrogenated castor oil fatty acid

What is claimed is:

1. A dispersing agent for dispersing a finely divided solid powder in a nonaqueous dispersion medium, which comprises a low acid value lanolin fatty acid and/or a salt thereof, said low acid value lanolin fatty acid being prepared by only self-esterifying lanolin fatty acid with elimination of water so as to reduce its acid value to 90–125 mg-KOH/g.

2. A dispersing agent according to claim 1 wherein said finely divided solid powder is at least one member selected from the group consisting of dyes, pigments, fillers, toners and solid lubricants.

3. A dispersing agent according to claim 1 which additionally contains a hydrogenated castor oil fatty acid and/or a saturated fatty acid containing 8 to 24 carbon atoms.

4. A dispersing agent according to claim 3 wherein said low acid value lanolin fatty acid and/or salt thereof and said hydrogenated castor oil fatty acid and/or saturated fatty acid containing 8 to 24 carbon atoms are used in a ratio of 98:2 through 50:50.

5. A dispersion comprising the dispersing agent of claim 1, a finely divided solid powder and a nonaqueous dispersion medium.

6. A dispersion according to claim 5 wherein said finely divided solid powder is a solid lubricant and said nonaqueous dispersion medium is a lubricating oil.

* * * * *